(12) United States Patent
Pit et al.

(10) Patent No.: US 7,072,136 B2
(45) Date of Patent: Jul. 4, 2006

(54) METHOD AND APPARATUS FOR DYNAMICALLY ESTABLISHING PITCH STATIC ATTITUDE IN HARD DISK DRIVE

(75) Inventors: Remmelt Pit, Cupertino, CA (US); Mike Suk, San Jose, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 82 days.

(21) Appl. No.: 10/845,469

(22) Filed: May 13, 2004

(65) Prior Publication Data

US 2005/0073768 A1 Apr. 7, 2005

Related U.S. Application Data

(63) Continuation-in-part of application No. 10/670,948, filed on Sep. 25, 2003, now Pat. No. 7,009,801.

(51) Int. Cl.
G11B 21/02 (2006.01)
(52) U.S. Cl. .......................... 360/75; 360/76
(58) Field of Classification Search ................ 360/75, 360/76
See application file for complete search history.

(56) References Cited

U.S. PATENT DOCUMENTS

| | | | |
|---|---|---|---|
| 4,663,682 A | 5/1987 | McNeil | 360/105 |
| 5,021,906 A | 6/1991 | Chang et al. | 360/103 |
| 5,289,325 A | 2/1994 | Morehouse et al. | 360/105 |
| 5,313,352 A | 5/1994 | Chikazawa et al. | 360/103 |
| 5,315,454 A | 5/1994 | Fukakusa | 360/75 |
| 5,377,058 A * | 12/1994 | Good et al. | 360/75 |
| 5,394,281 A | 2/1995 | Kajitani | 360/105 |
| 6,301,080 B1 | 10/2001 | Boutaghou | 360/255 |
| 6,362,933 B1 | 3/2002 | Sampietro et al. | 360/105 |
| 6,369,986 B1 | 4/2002 | Coon | 360/244.9 |
| 6,433,966 B1 * | 8/2002 | Tang et al. | 360/235.4 |

(Continued)

FOREIGN PATENT DOCUMENTS

EP 0 242 597 A2 3/1987

(Continued)

OTHER PUBLICATIONS

"Device for Dynamically Altering Slider Flying Height", IBM Technical Disclosure Bulletin, 91A 62719//SA8890388 Pub. No. 5, pp. 400-401. Oct. 1991.

(Continued)

Primary Examiner—Wayne Young
Assistant Examiner—Jason Olson
(74) Attorney, Agent, or Firm—John L. Rogitz

(57) ABSTRACT

A hard disk drive dynamically establishes a pitch static attitude (PSA) of a slider as appropriate to be higher during load and unload and lower during operation. Also, the PSA may be dynamically established during operation as a function of slider radial position and/or internal disk pressure and/or fly height to adjust slider fly height and/or contact stability. A PSA bias mechanism such as a piezoelectric layer can be coupled to the slider suspension to bend the flexure of the suspension to achieve PSA adjustment.

19 Claims, 1 Drawing Sheet

U.S. PATENT DOCUMENTS

| | | | |
|---|---|---|---|
| 6,473,259 B1 | 10/2002 | Kuo et al. | 360/75 |
| 6,501,625 B1 | 12/2002 | Boismier et al. | 360/294.7 |
| 6,535,355 B1 | 3/2003 | Boutaghou et al. | 360/245.7 |
| 6,757,124 B1 * | 6/2004 | Kelemen | 360/75 |
| 6,765,765 B1 * | 7/2004 | Bement et al. | 360/294.3 |
| 2001/0012182 A1 | 8/2001 | Boutaghou et al. | 360/245.7 |
| 2002/0024774 A1 | 2/2002 | Berger et al. | 360/294.7 |
| 2002/0054447 A1 | 5/2002 | Kurita et al. | 360/75 |
| 2002/0093769 A1 | 7/2002 | Suk et al. | 360/255 |
| 2002/0101686 A1 | 8/2002 | Bement et al. | 360/245.3 |
| 2003/0002195 A1 | 1/2003 | Sassolini et al. | 360/75 |
| 2003/0095361 A1 | 5/2003 | Shimanouchi et al. | 360/294.4 |
| 2003/0151854 A1 | 8/2003 | Lee | 360/234.6 |

FOREIGN PATENT DOCUMENTS

| | | |
|---|---|---|
| JP | 57-210479 | 12/1982 |
| JP | 61194684 | 8/1986 |
| JP | 1166382 | 6/1989 |
| JP | 1213877 | 8/1989 |
| JP | 3012078 | 1/1991 |
| JP | 4259970 | 9/1992 |
| JP | 6076508 | 3/1994 |
| JP | 6084221 | 3/1994 |
| JP | 6267219 | 9/1994 |
| JP | 2003036624 | 2/2003 |

OTHER PUBLICATIONS

Ramp loading "sweet spots". Yaeger and Hiller. Microsystem Technologies, vol. V.8, Pt No. 1, pp. 41-46, 2002.

"A Simplified 4-DOF Suspension Model for Dynamic Load/Unload Simulation and Its Application". Zeng et al. Transactions of the ASME Journal of Tribology, vol. 122, pp. 274-279, Jan. 2000.

"Development of a New Submicron Flying Ramp-Loading Head with Emphasis on Slider Roll Control Capability". Hashimoto et al. IEEE Transactions on Magnetics, vol. 28, No. 5 Pt. 2, pp. 2536-2538. Sep. 1992.

"Experimental Study of the Parameters That Determine Slider-Disk Contacts During Dynamic Loan-Unload". Jeong et al. Transactions of the ASME Journal of Tribology, vol. 114, No. 3, pp. 507-514. Jul. 1992.

"Simulations Uncover the Details of Load/Unload". Hua et al. Datatec Online, Edition 6, Section 5, pp. 101-104.

"Slider-Disk Contacts During the Loading Process in a Ramp-Load Magnetic Disk Drive". Ta-Chung Fu et al. ASME Advances in Information Storage Systems, vol. 6, pp. 41-54. 1995.

* cited by examiner

METHOD AND APPARATUS FOR DYNAMICALLY ESTABLISHING PITCH STATIC ATTITUDE IN HARD DISK DRIVE

RELATED APPLICATIONS

This patent application is a continuation-in-part of U.S. patent application Ser. No. 10/670,948, filed Sep. 25, 2003 now U.S. Pat. No. 7,009,801, from which priority is claimed.

I. FIELD OF THE INVENTION

The present invention relates generally to hard disk drives.

II. BACKGROUND OF THE INVENTION

Hard disk drives (HDD), particularly those that are used in mobile computers, have to be designed to withstand the rough usage typically seen in the mobile environment. The shock robustness of such drives has improved primarily in the ability to withstand large shocks during the nonoperating mode. Typically, when not operating the slider assembly, which includes the read and write elements of the HDD, is "unloaded" by moving the slider onto a ramp near the outer diameter of the disk. In this way, in the event of shock the slider does not contact the disk, which could otherwise damage the slider and/or disk.

Before the drive is assembled, a slider orientation parameter referred to as "roll static attitude" (RSA) is set to zero on average, while a parameter referred to as "pitch static attitude" (PSA) is set slightly above zero on average (typically 50–100 min). What this means is that the slider has a slight pitch relative to the load beam of the suspension (non-zero PSA), i.e., the leading edge of the slider is slightly closer to the disk than the trailing edge, whereas in the orthogonal dimension of roll the slider is parallel to the suspension (zero RSA, i.e., the radially outer edge of the slider is the same height as the radially inner edge).

One role of the PSA value is to impart a rotating moment force to the slider through the suspension stiffness. Therefore, by changing the PSA, the balance of forces is modified, and the slider will adjust its fly height to recover an equilibrium of forces. On current designs, increasing the PSA results in higher force acting on the trailing edge of the slider, causing the slider to fly closer to the disk.

The present invention makes the observation that PSA-induced torque is part of the balance of forces that determines the fly height of the slider. Specifically, a higher PSA pushes the trailing edge of the slider closer to the disk and decreases fly height, potentially to the point of the slider undesirably touching the disk. However, the present invention recognizes that a higher PSA is good for loading, because when the slider is loaded from the ramp to the disk, it can happen that the slider might touch the disk, and that if it touches at the leading edge the slider undesirably can pitch forward. With respect to the unloading process, the present invention understands that the force that is required to move ("snap") the slider away from the disk, if high, can cause the slider to undesirably vibrate and potentially damage the disk during unloading.

As further recognized herein, it is also desirable to avoid the drawback of making it harder to "snap" the slider onto the disk, i.e., to quickly establish the desired close spacing between the slider and disk. Such a circumstance otherwise could lead to undesirable bi-stable fly height, wherein the slider, which ordinarily flies at, e.g., fifteen nanometers from the disk once the air bearing is established between the slider and disk, must fly above the disk at a much higher height (e.g., a micrometer) until such time as the air bearing is established, complicating slider position control. It is further observed that the PSA requirements for optimized loading are usually contrary to those required for unloading. Optimizing flying conditions can yield yet a different target PSA value. Recognizing this problem, the present invention is provided.

SUMMARY OF THE INVENTION

A hard disk drive includes at least one rotatable disk and a slider juxtaposed with the disk. A suspension holds the slider. A pitch static attitude (PSA) bias mechanism is coupled to the suspension to establish a PSA of the slider.

A non-limiting PSA bias mechanism may include a piezo-electric structure bonded to the suspension. The PSA can be established by actuating the PSA bias mechanism to bend a flexure of the suspension to cause a trailing edge of the slider to be closer relative to the disk than a leading edge of the slider.

In some embodiments, a HDD controller can actuate the PSA bias mechanism to establish a relatively small positive PSA during read and write operations and a relatively large positive PSA during load and unload. The large PSA during loading reduces the risk of the leading edge touching the disk first and pitching the slider forward, while the large PSA during unloading reduces the force needed to "snap" the slider away from the disk and, hence, reduces the risk of vibrating the slider and potentially damaging the disk.

Furthermore, the HDD controller, if desired, can dynamically establish the PSA during operation based on HDD pressure and/or slider fly height and/or slider radial position.

In another aspect, a hard disk drive (HDD) includes a slider, a pitch static attitude (PSA) bias mechanism coupled to the slider to turn the slider, and a controller actuating the PSA bias mechanism to establish a first PSA during a first condition and a second PSA during a second condition, with the second PSA being different from the first PSA.

In still another aspect, a data storage device includes data storage means for storing data, and data transfer means juxtaposed with the data storage means for communicating data there between. Pitch static attitude (PSA) biasing means can be provided for establishing a PSA of the data transfer means. Also, logic means can actuate the PSA biasing means to establish a relatively large positive PSA of the data transfer means at least during load and unload and a relatively small positive PSA during operation.

In another aspect, a HDD controller can actuate the PSA bias mechanism to establish a relatively small positive PSA during load and a relatively large positive PSA during unload. The small PSA during loading reduces the risk of the slider not loading to its nominal fly height in the disk zone dedicated to load/unload near the load/unload ramp (if the PSA is too large, the slider can only load at smaller skew angles and linear velocity, which means the slider otherwise might load on to the data zone, which can cause media damage.) The large PSA during unload reduces the force needed to "snap" the slider away from the disk.

The details of the present invention, both as to its structure and operation, can best be understood in reference to the accompanying drawings, in which like reference numerals refer to like parts, and in which:

DETAILED DESCRIPTION OF THE PREFERRED EMBODIMENT

Figure 1:
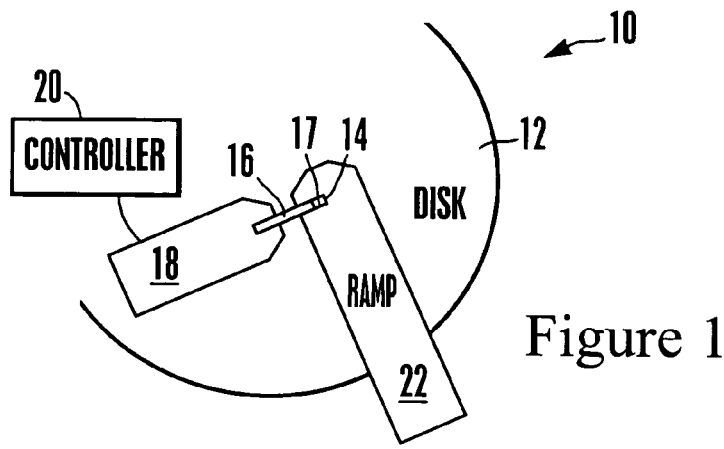
FIG. 1 is a top plan view showing the slider and suspension juxtaposed with a load/unload ramp and a disk.

Referring initially to FIG. 1, a hard disk drive (HDD) is shown, generally designated 10, which includes a rotatable hard disk 12 that can store data as written by a slider 14. The slider 14 is supported on a suspension 16, with the read and write heads being engaged with a flexure 17 of the suspension 16. The slider 14 can also read data from the disk 12. The suspension 16 can be engaged with a gimbal 18. A HDD controller 20 can control movement of the slider 14 relative to the disk 12, as well as effect reading and writing of data, in accordance with HDD principles known in the art. The HDD controller 20 may implement the dynamic pitch static attitude (PSA) biasing logic described further below. When not operating the slider 14 can be unloaded onto a ramp 22 in accordance with principles known in the art. While only a single disk 12/slider 14 assembly is shown, it is to be understood that plural disks and associated sliders can be provided in the HDD 10.

Figure 2:
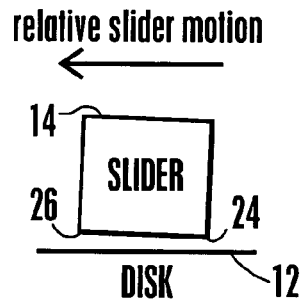
FIG. 2 is a side view of the slider during normal operation.
Figure 3:
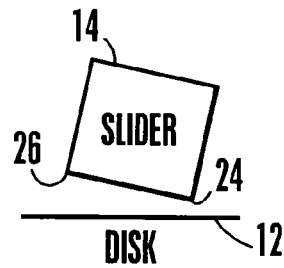
FIG. 3 is a side view of the slider during load/unload.

Now referring to FIG. 2, during operation the slider 14 preferably has a slightly positive PSA, wherein the trailing edge 24 of the slider 14 is slightly closer to the disk 12 than the leading edge 26. As set forth below, this slightly positive PSA can be "fine tuned" based on pressure within the HDD 10 and/or based on the radial position of the slider 14 and/or based on the fly height of the slider. In contrast, as shown in FIG. 3 during load off of/unload onto the ramp 22, the slider 14 has a relatively large positive PSA, wherein the trailing edge 24 of the slider 14 is significantly closer to the disk 12 than is the leading edge 26, compared to the PSA during operation shown in FIG. 2. It may now be appreciated that should slider-disk contact occur during loading, it will occur at the trailing edge 24, not the leading edge 26, so that slider vibration is reduced. Also, the force to lift the slider from the disk during unloading is reduced by the large PSA, thus reducing the risk of vibrating the slider.

Figure 4:
FIG. 4 is an elevational view of the suspension with a preferred non-limiting PSA bias mechanism being established by a layer of piezoelectric material.

FIG. 4 shows that in one non-limiting embodiment, a PSA bias mechanism can be implemented by a layer of piezoelectric material (PZT) 28 that is engaged with the suspension 16, preferably with the flexure 17 of the suspension 16. The PZT 28 may be a monomorph or bimorph or other piezoelectric structure that may be bonded to the flexure 17. When a voltage is applied to the PZT 28 as determined by the HDD controller 20 in accordance with the logic herein, the PZT 28 expands or contracts, bending at least a portion of the suspension 16 (e.g., the flexure 17) and, hence, establishing a predetermined PSA of the slider 14. If desired, the PZT 28 may not be bonded along its entire interface with the suspension 16 so that the PZT 28 may more freely deform in the desired direction. The particular type, orientation, and actuating voltages of the PZT 28 are selected as appropriate for the particular geometry of the HDD 10 and the desired PSA bias during load/unload.

Figure 5:
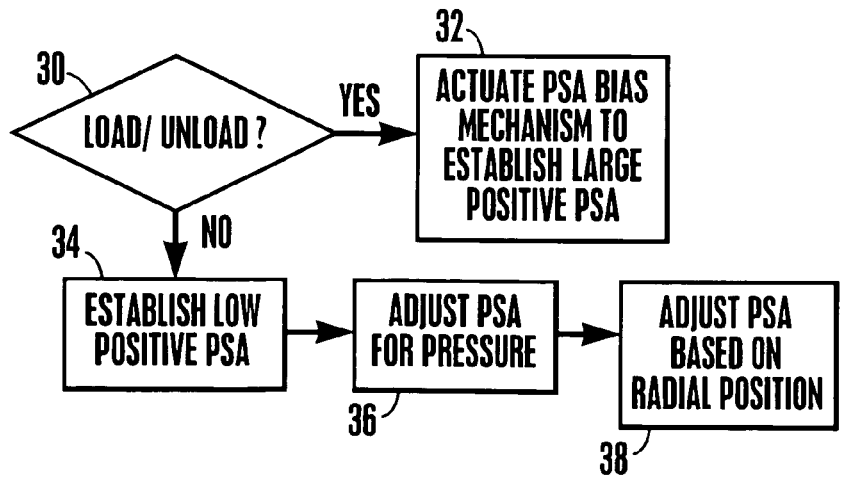
FIG. 5 is a flow chart of the present logic.

FIG. 5 shows the present logic in flow chart format, it being understood that the logic can be otherwise represented by, e.g., a state diagram. When it is determined (by, e.g., the HDD controller 20) at decision diamond 30 that the slider 14 is to be loaded off of or unloaded onto the ramp 22, the logic moves to block 32 to actuate the PSA bias mechanism to establish the relatively large positive PSA shown in FIG. 3. The actuation can be effected by, e.g., applying a predetermined voltage or removing voltage altogether from the preferred non-limiting PZT 28 shown in FIG. 4.

In some embodiments, a the positive PSA that is established during load is smaller than the positive PSA established during unload. The smaller PSA during loading reduces the risk of the slider not loading to it=s nominal fly height in the disk zone dedicated to load/unload near the load/unload ramp, whereas the larger PSA during unload reduces the force needed to "snap" the slider away from the disk.

In contrast, when it is determined that normal operation of the slider 14 is to be implemented, the logic flows to block 34 to actuate the PSA bias mechanism as appropriate to establish the slightly positive PSA of the slider 14 shown in FIG. 2.

As examples, the head assembly can be biased such that when no voltage is applied to the PZT 28, a larger PSA is assumed, with a smaller PSA being established by energizing the PZT 28 against the bias. In this example, in case of emergency power off, the correct non-zero PSA is established for unloading by the material bias of the head assembly. Or, the opposite could be effected, wherein the head assembly is materially biased with a relatively small PSA and energizing the PZT 28 results in establishing a relatively large PSA, so that power is saved by not requiring PZT 28 voltages during operation.

In addition to the above, the PSA may be fine tuned during operation based on, e.g., radial position of the slider 14 and/or internal pressure in the HDD 10 and/or fly height. More specifically, moving from block 34 to block 36, the PSA may be adjusted proportionally to pressure, i.e., the PSA is slightly decreased for lower pressures and slightly increased for higher pressures. Decreasing the PSA during operation for lower HDD pressures reduces the torque force applied to the trailing edge and thus reduces the decrease in fly height that can occur when pressure drops, making the HDD 10 less sensitive to pressure fluctuations.

Also, the logic may move to block 38, wherein the PSA may be adjusted slightly based on the radial location of the slider over the disk. This can be done to adjust fly height or avoid contact instability. The desired PSA values and/or corresponding PZT 28 voltages can be accessed using an empirically generated lookup table for various radial positions of the head.

The table can be defined based on magnetic properties such as readback signal, overwrite value, bit error rate, etc. and/or on mechanical properties of clearance established e.g., by decreasing the pressure until head-disk contact occurs.

Similarly, PSA can be increased during operation if the fly height increases, and decreased during operation if the fly height decreases. Magnetic signal amplitude can be monitored to detect unwanted variations in fly height.

While the particular METHOD AND APPARATUS FOR DYNAMICALLY ESTABLISHING PITCH STATIC ATTITUDE IN HARD DISK DRIVE as herein shown and described in detail is fully capable of attaining the above-described objects of the invention, it is to be understood that it is the presently preferred embodiment of the present invention and is thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more". It is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. '112, sixth paragraph, unless the element is expressly recited using the phrase "means for" or, in the case of a method claim, the element is recited as a "step"instead of an "act". Absent express definitions herein, claim terms are to be given all ordinary and accustomed meanings that are not irreconcilable with the present specification and file history.

What is claimed is:

1. A hard disk drive, comprising:
   at least one rotatable disk;
   at least one slider juxtaposed with the disk;
   a suspension holding the slider;
   a pitch static attitude (PSA) bias mechanism coupled to the suspension to establish a PSA of the slider; and
   a controller actuating the PSA bias mechanism to establish a larger PSA during ramp unload operations than a PSA established during ramp load operations.

2. The disk drive of claim 1, wherein the PSA bias mechanism includes at least one piezoelectric structure bonded to the suspension.

3. The disk drive of claim 1, wherein the controller is a HDD controller actuating the PSA bias mechanism.

4. The disk drive of claim 3, wherein the HDD controller actuates the PSA bias mechanism to establish a first PSA during read and write operations and a second PSA during at least one of: load, and unload, the second PSA having a larger magnitude than the first PSA.

5. The disk drive of claim 3, wherein the PSA is established by actuating the PSA bias mechanism to bend a flexure of the suspension to cause a trailing edge of the slider to be closer to the disk than the leading edge of the slider.

6. The disk drive of claim 3, wherein the HDD controller dynamically establishes the PSA during operation proportionally to HDD pressure.

7. The disk drive of claim 3, wherein the HDD controller dynamically establishes the PSA during operation based on slider fly height.

8. The disk drive of claim 3, wherein the HDD controller dynamically establishes the PSA during operation based on slider radial position.

9. A hard disk drive (HDD) comprising:
   at least one slider;
   at least one pitch static attitude (PSA) bias mechanism coupled to the slider to turn the slider; and
   at least one controller acquiring the PSA bias mechanism to establish a first PSA during a first condition and a second PSA during a second condition, the second PSA being different from the first PSA, wherein the first condition is slider unload operations and the second condition is slider load operations, both PSAs being positive, the second PSA being smaller than the first PSA.

10. The HDD of claim 9, wherein the PSA is established to be smaller during reading from, and writing to, a disk, and the PSA is established to be relatively larger when loading the slider from, and unloading the slider to, a ramp.

11. The HDD of claim 9, wherein the second PSA is established by actuating the PSA bias mechanism to bend a flexure associated with the slider to cause a trailing edge of the slider to be lower relative to a data storage surface than a leading edge of the slider.

12. The disk drive of claim 9, wherein the PSA bias mechanism includes at least one piezoelectric structure bonded to a suspension associated with the slider.

13. The disk drive of claim 9, wherein the PSA is dynamically established during operation based on HDD pressure.

14. The disk drive of claim 9, wherein the PSA is dynamically established during operation based on slider fly height.

15. The disk drive of claim 9, wherein the PSA is dynamically established during operation based on slider radial position.

16. A data storage device, comprising:
    data storage means for storing data;
    data transfer means juxtaposed with the data storage means for communicating data therebetween;
    pitch static attitude (PSA) biasing means for establishing a PSA of the data transfer means; and
    logic means for actuating the PSA biasing means to establish a relatively large positive PSA of the data transfer means at least during at least one of: load, and unload, and a relatively small positive PSA during operation.

17. The data storage device of claim 16, wherein the PSA biasing means is established at least in part by a piezoelectric element.

18. The data storage device of claim 16, wherein the logic means dynamically establishes the PSA during operation based on at least one of: HDD pressure, slider fly height, and slider radial position.

19. The data storage device of claim 16, wherein the logic means establishes a smaller PSA during load than during unload.

* * * * *